May 27, 1969   J. R. BAILEY ET AL   3,446,467
PANEL MOUNTING FOR ELECTRICAL COMPONENTS AND THE LIKE
Filed March 13, 1967.
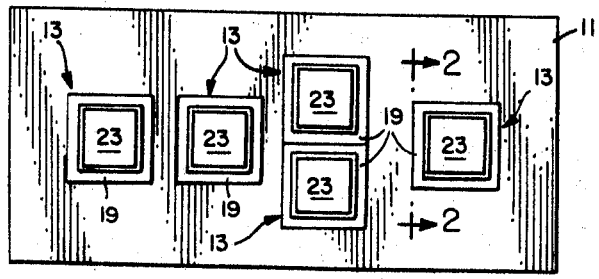
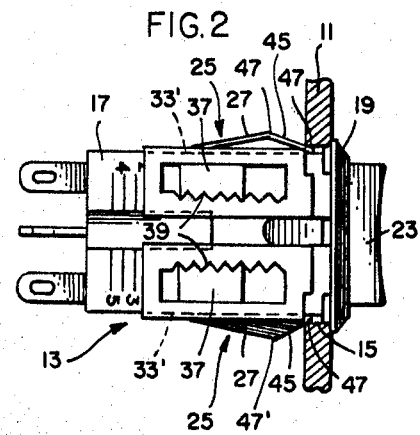
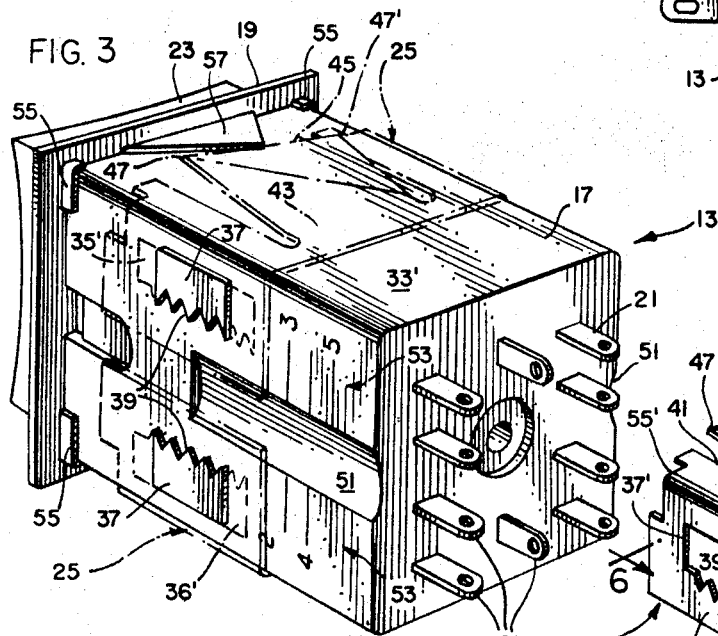
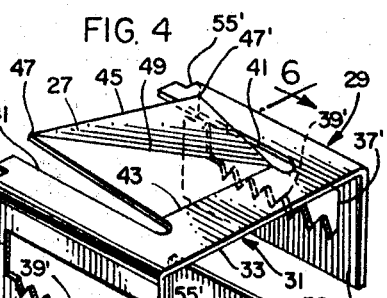
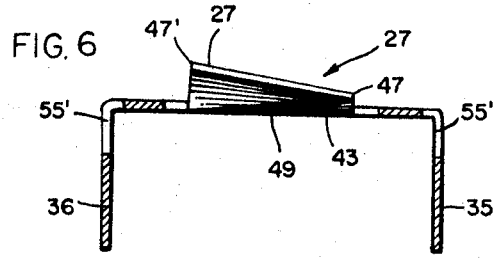
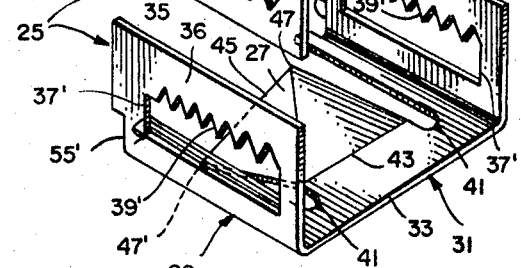
*INVENTORS:*
JAMES R. BAILEY
ROBERT J. BOKOSKY
BY: Marzall, Johnston, Cook & Root
ATT'YS United States Patent Office 3,446,467
Patented May 27, 1969

3,446,467
PANEL MOUNTING FOR ELECTRICAL COMPONENTS AND THE LIKE
James R. Bailey, Chicago, and Robert J. Bokosky, Park Ridge, Ill., assignors to Switchcraft, Inc., Chicago, Ill., a corporation of Illinois
Filed Mar. 13, 1967, Ser. No. 622,689
Int. Cl. H02b 7/00
U.S. Cl. 248—27
5 Claims

ABSTRACT OF THE DISCLOSURE

An arrangement for the panel mounting of devices, such as electrical switches and the like, by the application and latching of the device, in a panel opening, entirely from one side of the panel, through employment of mounting clip means detachably and adjustably secured upon the device to be mounted, said clip means comprising thin gauge, resilient sheet material and hence being insertable, through the panel opening, in position attached upon the device to be mounted, the clip means providing an outstanding latching lug, depressible to permit passage thereof, together with the device to be mounted, into the panel opening, in position to engage a latching edge of the lug with an edge of the panel opening, to secure the device in mounted position, on the panel, said clip means and the device having interengaging abutment means, for securing the clip means in longitudinally adjusted position on the device to be mounted, to thereby accommodate mounting panels of diverse thickness.

---

The present invention relates in general to improved means for and method of mounting electrical switches and other devices on support panels, the invention having more particular reference to the provision of mounting means insertable, with the device to be mounted, through an opening in a panel, from one side of the panel only, to thereby secure the device in mounted position on the panel.

Heretofore, devices of the character mentioned have been mounted on panels by inserting, from the back of the panel, the proximal end of the device, through a panel opening, and by thereafter applying suitable fastening means, such as a clamp nut, upon portions of the device that project at the front face of the panel, such procedure requiring access to both sides of the panel, in mounting the device thereon.

An important object of the present invention is to provide for the application and attachment of a device to be mounted, entirely from the front side of the panel; a further object being to provide for attaching the device on a support panel by securing a resilient fastening clip on the device, and by thrusting the device, with attached clip, into a panel opening, from the front of the panel, the clip, upon entering the opening, being adapted to engage the edge thereof to retain the device, in panel mounted position; a still further object being to form a resilient fastening lug or blade on a supporting clip adapted for attachment on the device to be mounted; yet another object of the invention being to provide the device to be mounted with outstanding seating means, such as a peripheral flange, adapted to engage and seat upon the front face of a support panel, at a mounting opening therein, and to secure the resilient fastening lug on the device, in position longitudinally spaced from the seating ledge.

Another important object is to provide a latch carrying clip of the character mentioned having interengaging means, on the clip and on the device to be mounted for securing the clip in longitudinally adjusted relation on the device to accommodate mounting panels of diverse thickness; a further object being to form the clip with a serrated or saw-tooth configuration adapted for longitudinally adjustable engagement with a correspondingly serrated formation on the device to be mounted; a still further object being to provide an index scale on the device for indicating the adjusted positions of the clip required for accommodating panels of various standardized thicknesses.

Another important object is to provide a mounting clip of the character mentioned comprising a thin gauge piece of resilient sheet metal, such as steel, configurated to snugly embrace the device to be mounted on a panel, whereby the clip when embracingly secured on the device, may freely pass therewith through the panel opening, in which the device is to be secured, the clip being formed with a resilient outstanding fastening lug that is depressible against the surface of the device being mounted, in order to pass therewith into the opening, said lug being adapted to engage the edge of the panel opening, in order to secure the device in mounted position on the panel.

The foregoing and numerous other important objects, advantages and inherent functions of the invention will become apparent as the same is more fully understood from the following description, which, taken in conjunction with the accompanying drawings, discloses a preferred embodiment of the invention.

Referring to the drawings:

FIG. 1 is a front view of a panel showing several devices mounted thereon in accordance with the present invention;

FIG. 2 is an enlarged sectional view taken substantially along the line 2—2 in FIG. 1;

FIG. 3 is an enlarged perspective view of a panel mountable device of the sort shown in FIG. 2, as seen from the distal end of the device;

FIGS. 4 and 5 are perspective views of mounting clip means adapted for removable attachment on the device shown in FIG. 3 in order to permit it to be mounted on a support panel in accordance with the present invention; and FIG. 6 is a sectional view taken substantially along the line 6—6 in FIG. 4.

To illustrate the invention, the drawings show a support panel 11, of the sort commonly employed for the mounting of devices 13, such as electrical switches and other panel mountable devices. The panel 11 may comprise a plate of material having substantially uniform thickness and provided with mounting openings 15 peripherally shaped to snugly receive the devices to be mounted. As shown, such devices may comprise electrical push-button switches of square or other preferred sectional configuration, the same each embodying a housing 17 having an outstanding flange or ledge 19, preferably formed at its proximal end, the housing 17, rearwardly of the ledge 19, being shaped to extend freely in an opening 15, with the ledge or flange 19 seating upon the front face of the panel 11 outwardly of the opening 15 in which the device 13 is to be mounted and secured.

Although the invention is not necessarily limited to the mounting of push-button switches, nor to devices having square sectional shape for assembly in square panel openings, the illustrated device 13 comprises a push-button switch structure of the sort shown in a copending application filed Mar. 13, 1967, Ser. No. 622,760, the same comprising a hollow housing of square sectional configuration open at its proximal end and a push-button frame axially movable within the housing and carrying one or more switch blades in position to cooperate with contact forming conductor strips 21, within the housing, to form one or more switches, the frame having a finger piece 23 projecting outwardly of the housing at its proximal end in position for switch actuating operation. No claim, however, is herein made to the novel features of the push-button switch mechanism.

The device 13 to be mounted, on the panel 11, may be applied in mounted position merely by inserting the distal end of the device in the panel opening 15, in which the device is to be mounted, and by then pressing the device through the opening 15 until its seating ledge or flange 19 engages the front face of the panel latching means 25 being secured upon the housing 17, behind the seating ledge 19, in position to pass freely into the opening 15, as the device being mounted is moved toward mounted position on the panel, the latching means embodying one or more resilient fastening blades or lugs 27, projecting outwardly of the housing 17 and depressible thereon to permit the same to pass freely into the opening 15, with the device to be mounted, said lug or lugs being adapted to press outwardly of the housing and to firmly engage the facing sides of the opening 15, to thereby hold the device 13 in mounted position.

The latching lug or lugs 27 may be formed on and as an integral part or parts of mounting clip means 29 adapted for attachment upon the device to be mounted, the clip means 29 being preferably formed of thin gauge resilient sheet metal formed to snugly embrace and hence to be secured upon the housing 17 of the device to be mounted; and the latching lugs or lips 27 preferably comprise integral portions of the clip means 29, which, if desired, may comprise a single piece of sheet metal shaped in conformity with the outer surfaces of the housing and formed to embrace the same, the clip means preferably comprising at least a pair of outstanding latching lugs 27 on diametrically opposite sides of the housing. Alternately, and preferably, as shown in the drawings, the clip means 25 may comprise a pair of preferably identical clips 31 adapted to be detachably secured upon opposite sides of the housing 17.

As shown, each clip 31 may comprise a generally rectangular piece of thin gauge, resilient sheet metal, such as steel, bent to conform with the superficial shape of the housing 17 on which it is to be attached. Where the housing 17 is of square sectional configuration, as shown in FIGS. 2 and 3, each clip 31 may comprise a central or medial portion 33, sized to overlie opposite side surfaces 33' of the housing 17 and opposite end portions 35 and 36, bent at right angles to the medial portions 33, in position to overlie the corresponding opposite side portions 35' and 36' of the remaining faces of the housing 17.

The present invention contemplates the attachment of the latching means 25 on the housing 17, in adjustable spaced relationship with respect to the seating ledge 19, in order to accommodate for various thicknesses of the panel 11, on which the device is to be mounted. To this end the housing 17, on its surface portions 35' and 36', may be formed with shallow lands 37 having height of the order of the thickness of the sheet material of which the clip means 29 is formed, the oppositely facing edges of the lands, on the surfaces 35' and 36', being formed with serrations 39 providing a saw-toothed configuration extending longitudinally of the housing.

The downwardly turned end portions 35 and 36 of the clips likewise may be provided with openings 37' shaped to receive the lands 37 therein, to thus retain the clip means in mounted position on the housing 17, through the engagement of the serrated edges of the lands 37 with the correspondingly serrated edges 39' of the clip means, said serrated edges affording means for securing the clip means in various adjustably spaced positions, with respect to the seating ledge 19, the clip openings 37' being of substantially greater longitudinal width than the width of the lands 37 which they accommodate, when mounted on the housing 17.

The latching lugs 27 may be formed each on a corresponding clip 29, as an integral part of the clip extending between a pair of latch defining slots 41, formed, in the medial portions 33 of the clip, preferably adjacent and parallel to the edges thereof at which the end portions 35 and 36 are attached, said slots opening at the forward edge of said medial portions and terminating inwardly of their rear edges, whereby the latching blades or lugs 27 may be bent outwardly of said medial portions, as on bend lines 43. The forward edges of the blades 27 may each be cut back, on one side, to provide a rearwardly inclined latching edge 45, having a corner 47, on one side, disposed in line with the forward edge of the clip, in position to extend within the opening 15, medially between the front and rear faces of the panel, when the device 13 is in mounted position on the panel. The edge 45, at its end remote from the corner 47, has another corner 47' that is disposed substantially behind the front of the clip. Portions of each blade 27, remote from the corner 47, may be inclined outwardly of its remaining portions, by bending the same along a diagonal bend line 49, to thereby present the latching edge 45 in position to cross or intersect the edge of the opening 15, at the rear face of the panel, and thus bear upon and latchingly engage with said edge to hold the device in panel mounted position. In this connection, it will be seen that the interfitting serrated portions 39 and 39' permit the clip means to be adjusted longitudinally on the housing 17 to present the latch blade corner 47 at such a position, spaced from the ledge 19, that the corner will extend a short distance within the opening 15, from the rear side of the panel, when the ledge is seated on the front face of the panel. In the illustrated embodiment, the outer surfaces of the housing walls may have width of the order of nine-sixteenths of an inch, and length of the order of seven-eighths of an inch, from the rear face of the flange 19 to the distal or closed rear end of the housing. On such a housing, the serrated portions 39 and 39' may be sized to provide for adjustment of the clips by increments of the order of three-sixty-fourths of an inch. The corners 47' of the blades 27 may be disposed behind the front of the clips a distance in excess of three-sixty-fourths of an inch, say, for example, a distance of the order of one-sixteenth to one-eighth of an inch, so that the edge 45 may perform its latching function with the rear edge of the opening 15 regardless of variations in panel thickness, between the thickness ranges defined by the adjustment increments provided by the serrated portions 39 and 39'. The inclined latching edge 45 will latch onto a panel of any thickness within a maximum and minimum accommodated at the several adjusted positions of the serrated portions, by progressively altering the locus of latching engagement of the inclined edge 45 with the facing edge of the opening 15, in a direction away from the blade corner 47, with increase in panel thickness.

In order to facilitate detachment of the clip means from mounted position on the housing 17, the opposite sides thereof may be formed each with a shallow groove 51 in position underlying the terminal edges of the end portions 35 and 36 of the clip means 25. The grooves serve to facilitate the raising of the outer edges of said end portions away from the underlying wall surfaces of the housing, to thereby aid in disengaging the serrated portions of the clip means and lands, and thus permit the clip means to be released from latching engagement with the lands.

In order to indicate the adjusted position of the clip means on the housing 17, the housing wall portions 35' and 36' may be formed with graduated index marks 53 on opposite sides of the longitudinal groove 51, adjacent the distal end of the housing, in order to show, at the rear edges of the clip means, the spacement of the forward edges thereof away from the seating ledge 19, so that the clip means may be mounted precisely in adjusted position on the housing to accommodate the thickness of the panel upon which the device is to be mounted.

The housing 17 is preferably formed with bosses 55, at the junction of the seating ledge 19 with the rearwardly extending side walls of the housing, said bosses extending at and around each of the corners of the housing in position to snugly seat in the corners of the mounting opening 15 and positively center the housing in the opening when mounted therein. The corners of the clips, at their front edges, may be formed with notches 55' to accommodate the bosses 55 when the clip means is in mounted position, on the housing, in contact with the rearwardly facing surfaces of the ledge 19, which is the preferred mounted position of the clip means prior to adjustment thereof on the housing for the accommodation of a particular panel on which the device is to be attached.

The housing may also be formed with triangular lands 57, at the junction of the seating ledge 19 with the faces 33' of the housing, in position abutting the inclined edges 45 of the latching lugs 27, when the front ends of the clips about the edge 19, the purpose of the lands 57 being to increase housing wall thickness and thus strengthen and rigidify the same.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. An arrangement for the panel mounting of an electrical switch, or like device shaped to fit an opening in the panel and having outstanding ledge means adapted to seat upon one side of the panel, at said opening, comprising resilient fastening means supported on the device to be mounted, in position, behind said ledge, to latchingly engage the panel at said opening, said fastening means being depressible on the device for passage, therewith, into the panel opening, as the device moves therein to mounted position on the panel, the mounting means for said device comprising a carrying clip adjustable, on the device to be mounted, to present the fastening means at any selected one of a plurality of spaced positions, with respect to the ledge means, said carrying clip and said device having interengaging abutment means.

2. An arrangement, as set forth in claim 1, wherein the carrying clip and the device to be mounted are formed with a longitudinally extending series of interfitting projections and projection engaging cavities to determine the several adjusted positions of the carrying member on the device to be mounted.

3. An arrangement as set forth in claim 1, wherein the device to be mounted is formed with a serrated portion extending normal to the ledge means, and the clip is formed with a serrated portion in position to interfit with the serrated portion of the device to be mounted, when the clip means is mounted on and in embracing relation with the device, in any one of a plurality of relatively shifted positions of the clip on the device, in a direction normal to the ledge means.

4. An arrangement for the panel mounting of an electrical switch, or like device shaped to fit an opening in the panel and having outstanding ledge means adapted to seat upon one side of the panel, at said opening, comprising resilient fastening means supported on the device to be mounted, in position, behind said ledge, to latchingly engage the panel at said opening, said fastening means being depressible on the device for passage, therewith, into the panel opening, as the device moves therein to mounted position on the panel, the mounting means comprising a carrying clip adjustable, on the device to be mounted, to present the fastening means at any selected one of a plurality of spaced positions, with respect to the ledge means, and the device to be mounted being formed with a graduated index scale to indicate the several adjusted positions of the carrying clip on the device to be mounted.

5. An arrangement for the panel mounting of an electrical switch, or like device shaped to fit an opening in the panel and having outstanding ledge means adapted to seat upon one side of the panel, at said opening, comprising resilient fastening means supported on the device to be mounted, in position, behind said ledge, to latchingly engage the panel at said opening, said fastening means being despressible on the device for passage, therewith, into the panel opening, as the device moves therein to mounted position on the panel, the mounting means comprising a carrying clip adjustable, on the device to be mounted, to present the fastening means at any selected one of a plurality of spaced positions, with respect to the ledge means, the device to be mounted being formed with an outwardly projecting shallow protuberance and the clip being formed with an opening for latchingly receiving the protuberance to aid in holding the clip in position attached on the device to be mounted, the shallow protuberance on the device to be mounted comprising a rectangular land having a serrated side extending in a direction normal to said ledge, said clip being formed with an opening having an edge serrated for interlocking engagement with the serrated side of said land, in any one of a plurality of relatively shifted positions of the clip, on the device, in a direction normal to the ledge means, the length of the opening, in said direction being substantially greater than that of the land in the same direction.

References Cited

UNITED STATES PATENTS

| 1,933,358 | 10/1933 | Almcrantz | 220—3.6 X |
| 2,209,146 | 7/1940 | Bessette | 174—58 X |
| 2,730,688 | 1/1956 | Miller | 339—128 |
| 2,879,912 | 3/1959 | Appleton | 248—27 X |
| 3,119,909 | 1/1964 | Cutler | 339—128 X |

ROY D. FRAZIER, *Primary Examiner.*

F. DOMOTOR, *Assistant Examiner.*

U.S. Cl. X.R.

174—57; 339—128